United States Patent [19]
Judge

[11] 3,741,614
[45] June 26, 1973

[54] ROLLER BEARINGS

[75] Inventor: Ronald Anthony Judge, Kingsthorpe, England

[73] Assignee: The Timken Company, Canton, Ohio

[22] Filed: Aug. 27, 1971

[21] Appl. No.: 175,595

[52] U.S. Cl. ............................................. 308/180
[51] Int. Cl. ........................................... F16c 19/14
[58] Field of Search ........................... 308/180, 207

[56] References Cited
UNITED STATES PATENTS

| | | | |
|---|---|---|---|
| 2,652,285 | 9/1953 | Negri | 308/001 |
| 2,855,251 | 10/1958 | McNicoll | 308/180 |
| 2,875,004 | 2/1959 | McNicoll | 308/180 |
| 3,156,506 | 11/1964 | Scheifele et al. | 308/207 A |

*Primary Examiner*—Charles J. Myhre
*Assistant Examiner*—Frank Susko
*Attorney*—Gravely, Lieder & Woodruff

[57] ABSTRACT

An axle box receives a pair of roller bearings and has an inwardly projecting abutment against which the outer races of the roller bearings abut. The inner races of the bearings receive a reduced journal at the end of an axle and are captured between a shoulder at one end of the journal and an end cap at the other end of the journal. A spacer is fitted around the journal and between the two inner races, and this spacer is selected to provide the correct adjustment for the bearings. The abutment encircles the spacer and is disposed between the outer races of the bearings so that thrust loading is transmitted between the axle box and bearings through the abutment.

3 Claims, 2 Drawing Figures

PATENTED JUN 26 1973  3,741,614

INVENTOR:
RONALD ANTHONY JUDGE
BY Graveby, Lieder & Woodruff
ATTORNEYS.

3,741,614

ROLLER BEARINGS

BACKGROUND OF THE INVENTION

The invention relates to axle bearing assemblies, and is particularly, but not exclusively, applicable to bearing assemblies which are used as journal bearings on the wheel axles of rail borne rolling stock.

In one conventional wheel axle bearing arrangement, a two row self-contained sealed roller bearing is housed in an adaptor which fits loosely over the bearing and which is prevented from axial displacement by half flanges on the adaptor which engage over the ends of the outer race of the bearing. The adaptor is a loose fit on the bearing and merely provides the means for transferring the load of the super-structure to the bearing and thence to the axle and wheels.

This arrangement provides the advantages of a lightweight construction but, because the two rows of rollers have a unified outer race, the axial spacing between the rows of rollers is fixed and design problems can sometimes arise as a result.

One proposal for overcoming this difficulty has been to fit a pair of single row roller bearings in a conventional axle box so that the axial spacing of the bearings can be chosen as desired. However, the advantages of a lightweight construction are sacrificed with such an arrangement since the conventional covers and sealing arrangements for the axle box must still be used. The cost of such an arrangement is also higher.

SUMMARY OF THE INVENTION

According to the present invention there is provided an axle bearing assembly comprising an open-ended axle box having internal inwardly extending abutment means, a pair of roller bearings located in the axle box and mutually spaced lengthwise of the axle box and disposed on opposite sides of the abutment means with the inner race of each bearing engaging the axle and the abutment means being engaged by the outer races of the bearings but not by the inner races, spacer means disposed between and engaging the inner races of the bearings, and means for retaining the bearings on the axle.

An advantage of the invention is that it permits a choice for the spacing between the roller bearings without undue sacrifice of lightness of construction.

The abutment means may comprise a single continuous or discontinuous annular rib formed integrally with the axle box, or two such ribs mutually spaced lengthwise of the axle box. In the interests of speedy and accurate machining of the axle box, the abutment means may comprise a single separate part, typically a snap ring, received in an internal annular recess machined in the axle box, or two such parts mutually spaced lengthwise of the axle box.

In a bearing assembly according to the invention mounted on an end portion of an axle, the inner races of the roller bearings are preferably received on a reduced diameter portion of the axle and are preferably retained thereon by an end cap which is bolted to the respective end of the axle.

DESCRIPTION OF THE DRAWINGS

Two exemplary embodiments of the invention will now be described with reference to the accompanying drawings in which.

In the drawings, like parts are identified by the same reference numerals.

DETAILED DESCRIPTION

Figure 1:
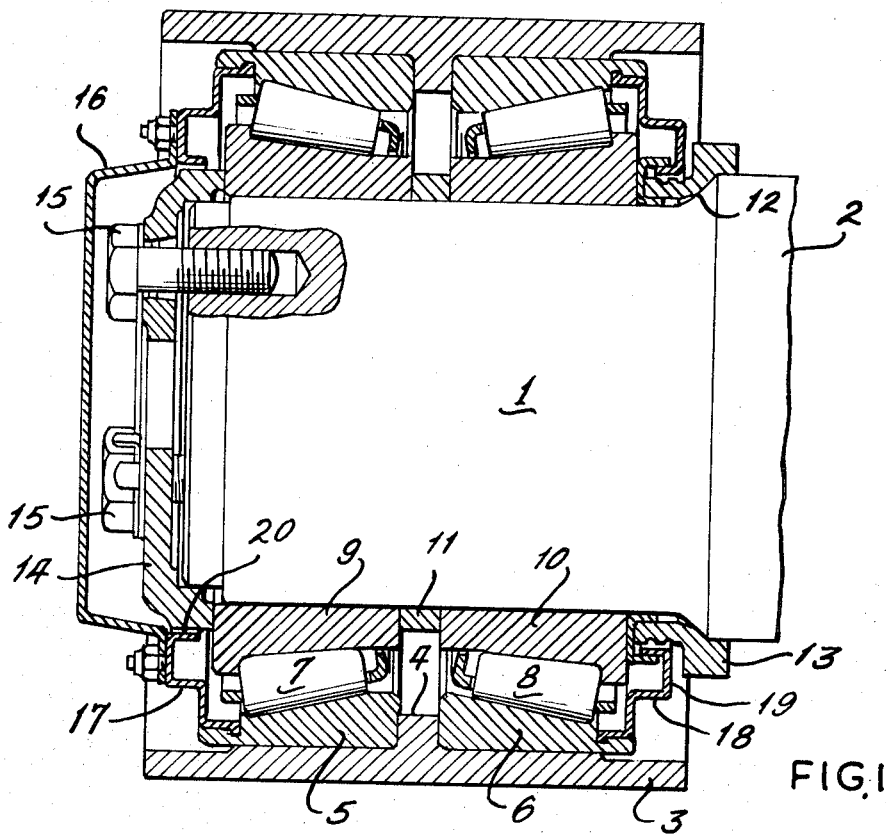
FIG. 1 is a sectional elevation of one embodiment of a railway wheel axle bearing assembly according to the invention.

Referring to FIG. 1, a reduced diameter railway wheel axle journal 1 of an axle 2 is received in an open-ended axle box 3 having an integral central annular abutment rib 4. The radially outer races 5 and 6 of a pair of roller bearings 7 and 8 are located in the axle box and engaged against opposite sidewalls of the abutment rib 4 whilst the radially inner bearing races 9 and 10 engage the axle journal 1. Adjustment of the inner races 9 and 10 is performed by means of a spacer ring 11 whose width is chosen to provide the required adjustment of the bearings when fitted and clamped in position.

As embodied, the bearings 7 and 8 are tapered roller bearings of the single row type. However, the invention is not limited to the use of such bearings. The bearings are sealed by means to be described; such sealing may be effected by attached seals either of the rubbing or labyrinth type.

At the axially inner termination of the axle journal 1, there is a shoulder 12 against which a bearing retaining member in the form of abutment ring 13 engages. The inner races 9 and 10 and the spacer ring 11 are clamped together against the abutmnt ring 13 by means of a further retaining member in the form of end cap 14 which is engaged over the end of the axle and is retained in position on the axle by bolts 15. A lightweight end cover 16 is also provided which is attached to a seal or end ring 17 engaging in a recess in the outer race 5. Ring 17 has a portion 20 which extends adjacent the end cap 14, thus forming a non-rubbing labyrinth seal for the bearing 7. A further seal ring 18 corresponding to the ring 17 is provided at the other end of the axle box and extends into a similar recess in the outer race 6 of bearing 8. The ring 18 has a portion 19 which extends adjacent the abutment ring 13 thus forming a non-rubbing labyrinth seal for the bearing 8 to prevent the ingress of moisture and dust.

In the arrangement described according to the invention, the usual end covers of a conventional axle box, their seal attachments, adjusting devices, fastening bolts, and drilled and threaded lugs which normally accommodate the fastening bolts are dispensed with. There is consequentially a substantial saving in both weight and cost.

Figure 2:
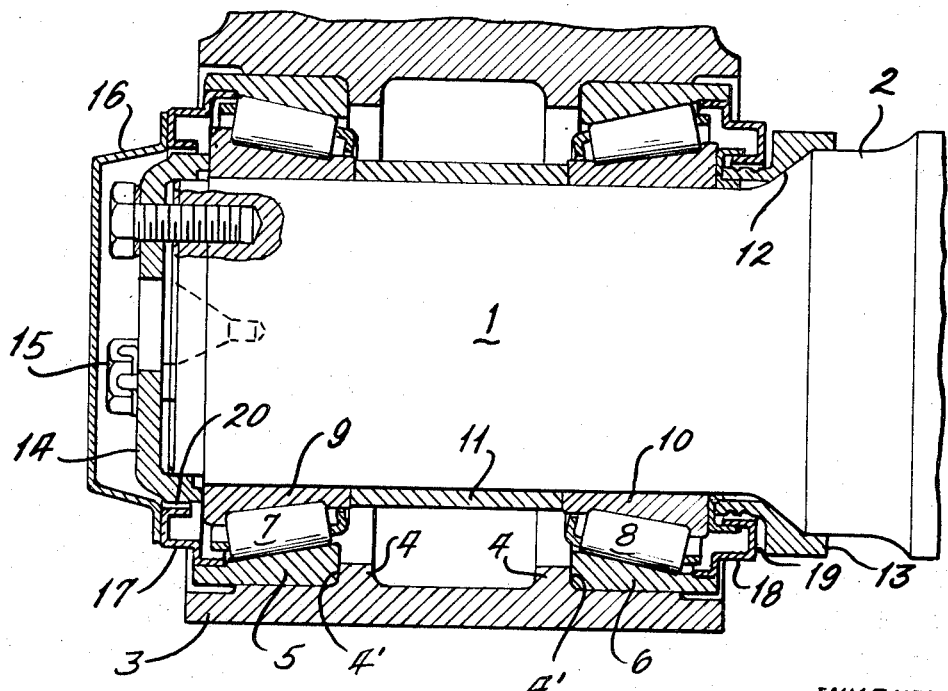
FIG. 2 is a view like that of FIG. 1 showing another embodiment.

In the embodiment shown in FIG. 2, the abutment means comprises two integral annular ribs 4 mutually spaced lengthwise of the axle box 3. The outer races 5 and 6 of the bearings engage the oppositely facing rib walls 4' on opposite sides of the abutment means.

The nominal spacing between the walls of the abutment means engaged by the roller bearings may be chosen at the wishes of the designer who can thus specify the distance between the rows of rollers in the axle box to, for instance, reduce the total length of an axle in the interests of economy of cost and weight. In this way, a designer can adjust other elements of a running gear to provide further savings.

An axle bearing assembly according to the invention is suitable for wheel axle application either outboard or inboard of the wheels.

What is claimed is:

1. An axle bearing assembly for installation on a journal at the end of an axle, said bearing assembly comprising: an axle box having aligned full bores opening out of the ends thereof and circumferentially extending rib means projecting inwardly into the interior of the axle box between the bores and forming abutment surfaces at the inner ends of the bores; inboard and outboard roller bearings in the axle box, each bearing including inner and outer races having opposed raceways and a single row of rollers located between the inner and outer races with the rollers engaged with the opposed raceways, the outer races being fitted into the bores of the axle box and abutting against the rib means, the inner races receiving the axle journal; an abutment ring at the inner end of the axle journal and forming an abutment for axially locating the inner race of the inboard bearing; an end cap fastened to the axle journal and extended across the outer end thereof, the end cap forming an abutment which axially locates the inner race of the outboard bearing; seal means attached to the outer race of the inboard bearing and cooperating with the abutment ring for maintaining lubricants in the axle box and for excluding contaminants from the interior of the box; an end ring attached to the outer race of the outboard bearing; and an end cover secured to the end ring and being detachable therefrom to provide access to the end cap; the end ring and end cover enclosing the outboard end of the axle box.

2. A bearing assembly according to claim 1 wherein the end ring cooperates with the end cap to form a seal at the end of the outboard bearing to prevent lubricant from leaving the vicinity of the bearing.

3. A bearing assembly according to claim 2 wherein the outer races of the two bearings have sockets which open outwardly of the axle box, the end ring being press-fitted into the socket of the outer race for the outboard bearing and the seal means being press-fitted into the socket in the outer race of the inboard bearing.

* * * * *